(12) United States Patent
Suto

(10) Patent No.: US 10,250,478 B2
(45) Date of Patent: Apr. 2, 2019

(54) COMMUNICATION DEVICE, COMMUNICATION CONTROL METHOD, AND COMMUNICATION SYSTEM

(71) Applicant: ALPINE ELECTRONICS, INC., Tokyo (JP)

(72) Inventor: Shunichi Suto, Fukushima (JP)

(73) Assignee: Alpine Electronics Inc., Tokyo (JP)

( * ) Notice: Subject to any disclaimer, the term of this patent is extended or adjusted under 35 U.S.C. 154(b) by 31 days.

(21) Appl. No.: 15/388,537

(22) Filed: Dec. 22, 2016

(65) Prior Publication Data
US 2017/0257302 A1 Sep. 7, 2017

(30) Foreign Application Priority Data
Mar. 7, 2016 (JP) ................. 2016-043306

(51) Int. Cl.
| | |
|---|---|
| H04L 12/26 | (2006.01) |
| H04L 12/947 | (2013.01) |
| H04W 24/08 | (2009.01) |
| H04W 72/04 | (2009.01) |
| H04W 36/30 | (2009.01) |
| H04L 12/24 | (2006.01) |
| H04W 36/06 | (2009.01) |
| H04W 36/00 | (2009.01) |

(52) U.S. Cl.
CPC .......... *H04L 43/10* (2013.01); *H04L 43/0852* (2013.01); *H04L 49/25* (2013.01); *H04W 24/08* (2013.01); *H04W 36/30* (2013.01); *H04W 72/0446* (2013.01); *H04L 41/0659* (2013.01); *H04L 43/16* (2013.01); *H04W 36/03* (2018.08); *H04W 36/06* (2013.01)

(58) Field of Classification Search
None
See application file for complete search history.

(56) References Cited

U.S. PATENT DOCUMENTS

| | | | | |
|---|---|---|---|---|
| 5,623,531 A * | 4/1997 | Nilssen | ..................... | H04B 3/54 379/324 |
| 5,758,263 A * | 5/1998 | Berger | ............... | H04M 1/72511 455/67.14 |
| 9,877,240 B1 * | 1/2018 | Saleh | ................ | H04W 36/0083 |

(Continued)

FOREIGN PATENT DOCUMENTS

JP 2005-150848 9/2005

*Primary Examiner* — Christopher T Wyllie
(74) *Attorney, Agent, or Firm* — Brinks Gilson & Lione

(57) ABSTRACT

There are provided a first communication time ascertaining unit that ascertains with a ping command communication delay time in communication with a smartphone, a communication state determining unit that determines whether a communication state is satisfactory in the communication with the smartphone based on the ascertained communication delay time, and a communication switching unit that switches a communication channel used for the communication with the smartphone, from one communication channel to another communication channel when the communication state in the communication with the smartphone is determined to be unsatisfactory. Therefore, the switching of the communication channel is performed only when it is ascertained that the communication state with the smartphone is unsatisfactory.

10 Claims, 10 Drawing Sheets

(56) References Cited

U.S. PATENT DOCUMENTS

| | | | |
|---|---|---|---|
| 2002/0044531 A1* | 4/2002 | Cooper | H04L 41/5038 370/248 |
| 2002/0176437 A1* | 11/2002 | Busch | H04W 16/10 370/437 |
| 2002/0184391 A1* | 12/2002 | Phillips | H04L 12/1827 709/248 |
| 2003/0039212 A1* | 2/2003 | Lloyd | H04L 41/0823 370/235 |
| 2003/0046388 A1* | 3/2003 | Milliken | H04L 41/046 709/224 |
| 2003/0147362 A1* | 8/2003 | Dick | H04B 7/2687 370/324 |
| 2003/0198204 A1* | 10/2003 | Taneja | H04L 5/023 370/332 |
| 2004/0258033 A1* | 12/2004 | Heinonen | H04W 88/08 370/338 |
| 2005/0071112 A1* | 3/2005 | Morriss | H04B 3/46 702/124 |
| 2005/0111484 A1* | 5/2005 | Obata | H04W 88/08 370/465 |
| 2006/0109815 A1* | 5/2006 | Ozer | H04W 48/16 370/329 |
| 2006/0153156 A1* | 7/2006 | Wentink | H04W 8/22 370/338 |
| 2008/0039091 A1* | 2/2008 | Eguchi | H04W 36/02 455/436 |
| 2009/0003210 A1* | 1/2009 | Jakobsen | H04L 43/0847 370/235 |
| 2010/0034370 A1* | 2/2010 | Rawlins | H04Q 3/0079 379/221.03 |
| 2011/0063979 A1* | 3/2011 | Matthews | H04L 45/302 370/237 |
| 2015/0188804 A1* | 7/2015 | Ashwood-Smith | H04L 47/32 370/392 |
| 2016/0234172 A1* | 8/2016 | Agarwal | H04L 63/0428 |
| 2017/0034807 A1* | 2/2017 | Lumbatis | H04W 28/20 |

* cited by examiner

FIG. 2

| | THRESHOLD VALUE | NUMBER OF TIMES THAT THRESHOLD VALUE IS SUCCESSIVELY EXCEEDED | NUMBER OF TIMES THAT THRESHOLD VALUE IS EXCEEDED FOR 10 SECONDS |
|---|---|---|---|
| MAXIMUM VALUE | 5.0 MILLISECONDS | N_max | M_max |
| MINIMUM VALUE | 2.2 MILLISECONDS | N_min | M_min |
| AVERAGE VALUE | 2.5 MILLISECONDS | N_avg | M_avg |

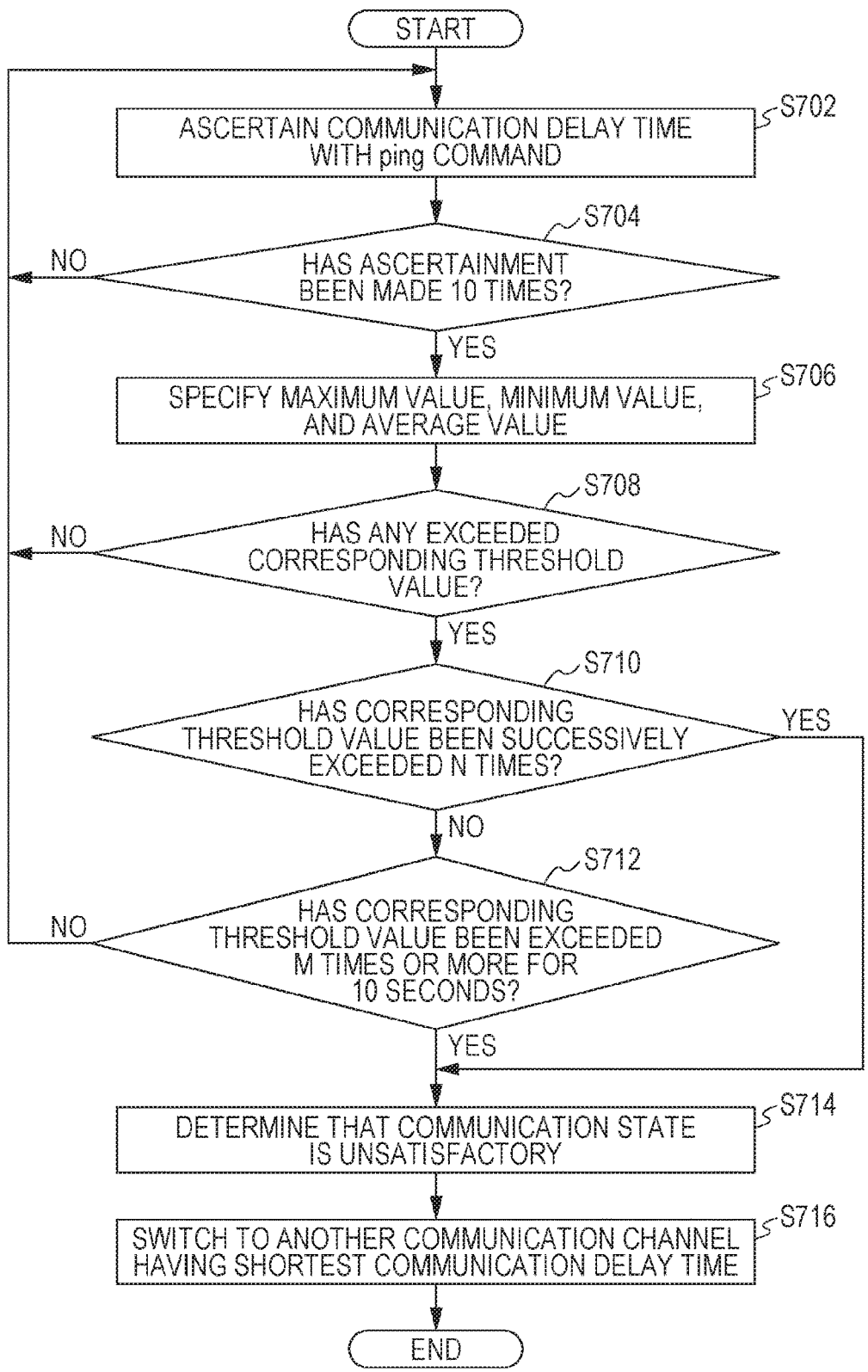

COMMUNICATION DEVICE, COMMUNICATION CONTROL METHOD, AND COMMUNICATION SYSTEM

RELATED APPLICATION

The present application claims priority to Japanese Patent Application Number 2016-043306, filed Mar. 7, 2016, the entirety of which is hereby incorporated by reference.

BACKGROUND

1. Field

The present disclosure relates to a communication device, a communication control method, and a communication system. Particularly, the disclosure is preferably used for a communication device, a communication control method, and a communication system, capable of performing communication through any one channel of a plurality of communication channels.

2. Description of the Related Art

Conventionally, a communication device, such as on-vehicle equipment, performs communication with a portable terminal, such as a smartphone, through any one channel of a plurality of communication channels so as to be able to cooperate with the portable terminal. The above cooperation allows, for example, the portable terminal to play back streaming video with respect to the on-vehicle equipment or allows the portable terminal to be operated through a touch panel of the on-vehicle equipment.

For example, in some cases, another communication device in a communication area of a destination, has already used a communication channel that is the same as a communication channel being currently used for communication with a portable terminal by this type of on-vehicle equipment. In this case, the on-vehicle equipment shares the same communication channel with the other communication device. Thus, the on-vehicle equipment is required to make the communication be on standby while the other communication device performs communication. Accordingly, for example, a problem occurs that video to which the portable terminal has performed a streaming playback with respect to the on-vehicle equipment stops, or a delay occurs in response of operation from the on-vehicle equipment with respect to the portable terminal. Particularly, delay time tends to lengthen as the number of communication devices using the same communication channel increases.

Thus, JP 2005-150848 A discloses the following technique. In a vehicle-to-vehicle communication device that mutually performs communication with vehicles in a group, throughput is calculated based on the utilization number of vehicles that use each channel in a plurality of communication channels. A communication channel used for communication with the vehicles in the group is switched to a communication channel having highest calculated throughput out of the plurality of communication channels. According to this technique, a communication channel having a favorable communication environment is selected so that efficient data communication can be performed.

SUMMARY

However, the technique in JP 2005-150848 A above continuously makes a switch to a communication channel having high throughput (namely, a communication channel having a small utilization number). Thus, a problem occurs that even in a case where a communication channel being currently used is sufficiently communicable, when another communication channel having throughput higher than that of the communication channel is present, the communication channel being currently used is fruitlessly switched.

The present disclosure has been made in order to solve the above problem. An object of the present disclosure is to be able to inhibit a delay in communication without a communication channel being currently used switched fruitlessly in the communication including a plurality of available channels.

In order to solve the above problem, a communication device according to the present disclosure uses any one communication channel of a plurality of communication channels, ascertains communication delay time in communication with a second communication device, with an echo request command during performance of the communication with the second communication device, and determines whether a communication state is satisfactory in the communication with the second communication device, based on the ascertained communication delay time. When the communication state in the communication with the second communication device is determined to be unsatisfactory, the communication channel used for the communication with the second communication device is switched from the one communication channel to another communication channel.

According to the present disclosure including the above configuration, only when it is practically ascertained that the communication state with the second communication device is unsatisfactory, based on the communication delay time ascertained with the echo request command, the switching of the communication channel used for the communication with the second communication device is performed. Therefore, according to the present disclosure, a delay in communication can be inhibited without a communication channel switched fruitlessly in the communication including a plurality of available channels.

BRIEF DESCRIPTION OF THE DRAWINGS

FIG. 2 is a table of an exemplary determination condition stored in a determination condition storing unit according to the first embodiment of the present disclosure;

FIG. 7 is a flow chart of exemplary processing by the on-vehicle equipment according to the second embodiment of the present disclosure;

DETAILED DESCRIPTION

A first embodiment of the present disclosure will be described below based on the drawings.

Figure 1:
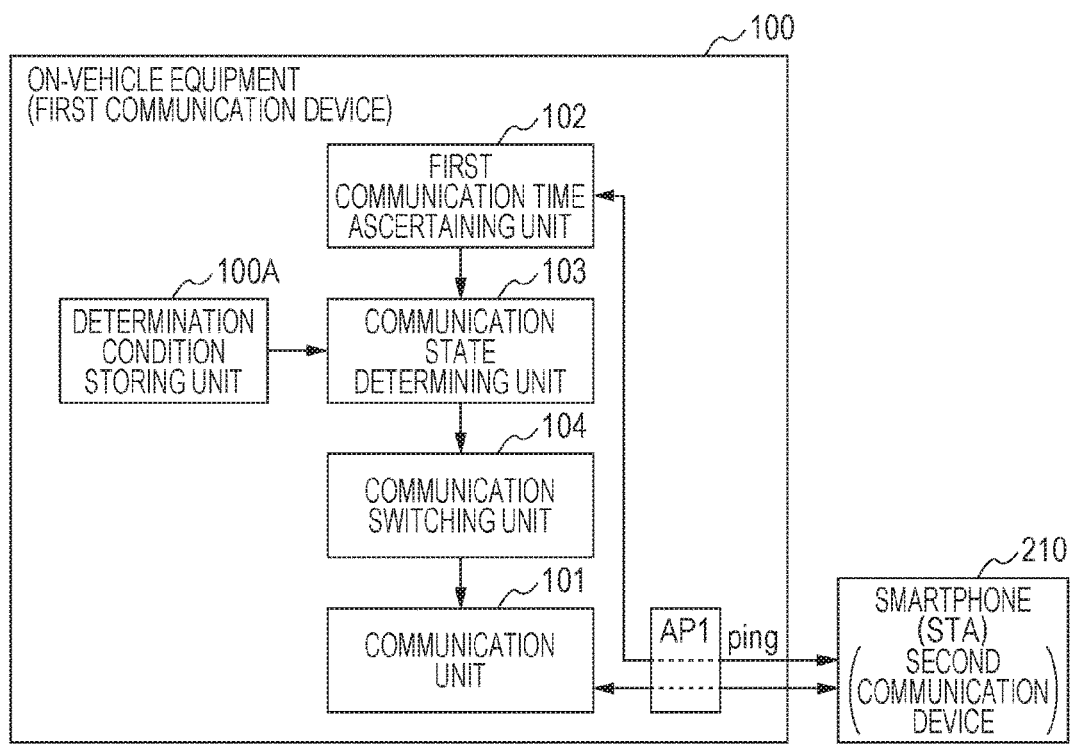
FIG. 1 is a block diagram of an exemplary functional configuration of on-vehicle equipment according to a first embodiment of the present disclosure.

FIG. 1 is a block diagram of an exemplary functional configuration of on-vehicle equipment 100 according to the first embodiment of the present disclosure.

FIG. 1 illustrates a communication system 10a including the on-vehicle equipment 100 (a first communication device) and a smartphone 210 (a second communication device). The on-vehicle equipment 100 is a communication device to be mounted on a vehicle, such as a motor vehicle. The on-vehicle equipment 100 has an access point AP1 for wireless communication. The smartphone 210 is a portable terminal being carried by a user (a passenger of the vehicle). The smartphone 210 has a function as a station (hereinafter, referred to as an "STA") for connecting with the access point AP1 of the on-vehicle equipment 100 through the wireless communication. When the smartphone 210 is present in a communication area of the access point AP1, the on-vehicle equipment 100 can perform the wireless communication with the smartphone 210 through any one communication channel of a plurality of communication channels.

As illustrated in FIG. 1, the on-vehicle equipment 100 according to the present embodiment includes a communication unit 101, a first communication time ascertaining unit 102, a communication state determining unit 103, and a communication switching unit 104, for the functional configuration. The on-vehicle equipment 100 also includes a determination condition storing unit 100A.

Each of the above functional blocks 101 to 104 can be configured with any of hardware, a digital signal processor (DSP), and software. For example, when the configuration is made with the software, each of the above functional blocks 101 to 104 practically includes, for example, a CPU, a RAM, and a ROM of a computer, and is achieved by operation of a program stored in a recording medium, such as the RAM, the ROM, a hard disk, or a semiconductor memory.

The communication unit 101 uses any one communication channel of the plurality of communication channels so as to perform the wireless communication with the smartphone 210 through the access point AP1 (for example, but not limited to, a streaming playback of video from the smartphone 210 to the on-vehicle equipment 100, or operation of the smartphone 210 through a touch panel of the on-vehicle equipment 100 (not illustrated). The wireless communication with the smartphone 210 uses a communication standard, such as Wi-Fi.

The first communication time ascertaining unit 102 transmits an echo request command to the smartphone 210 through the communication channel being used by the communication unit 101 so as to ascertain communication delay time in the communication with the smartphone 210 (indicates time spent from the transmission of the echo request command until reception of the response, according to the present embodiment). According to the present embodiment, a ping command is used for the echo request command. The reason is because the ping command is a command for simply measuring time spent for a round trip of data between pieces of equipment and data traffic of the command itself is considerably small so that influence is considerably small on the communication between the communication unit 101 and the smartphone 210.

According to the present embodiment, the first communication time ascertaining unit 102 repeatedly transmits the ping command, for example, per 100 milliseconds so as to ascertain the communication delay time. That is, the first communication time ascertaining unit 102 ascertains the communication delay time 10 times for one second. The first communication time ascertaining unit 102 stores the ascertained communication delay time into a memory until ascertaining, for example, 10 times of the communication delay time.

The communication state determining unit 103 determines whether a communication state is satisfactory in the communication with the smartphone 210, based on the communication delay time ascertained by the first communication time ascertaining unit 102 and a determination condition stored in the determination condition storing unit 100A (to be described in detail in FIG. 2).

Specifically, first, when the first communication time ascertaining unit 102 ascertains the communication delay time 10 times for one second, the communication state determining unit 103 reads the ascertained ten times of the communication delay time from the memory, and individually specifies a maximum value, a minimum value, and an average value therefrom. The communication state determining unit 103 determines whether the specified maximum value, minimum value, and average value have individually exceeded corresponding predetermined threshold values stored in the determination condition storing unit 100A (refer to FIG. 2).

The communication state determining unit 103 determines that the communication state is unsatisfactory in the communication with the smartphone 210 when any of the specified maximum value, minimum value, and average value has exceeded the corresponding predetermined threshold value N times, successively. Note that, as illustrated in FIG. 2, the determination condition storing unit 100A stores the number of the times N above and the corresponding predetermined threshold value above for each of the maximum value, the minimum value, and the average value.

Alternatively, the communication state determining unit 103 determines that the communication state is unsatisfactory in the communication with the smartphone 210 when any of the specified maximum value, minimum value, and average value has exceeded the corresponding predetermined threshold value M times or more within 10 seconds. Note that, as illustrated in FIG. 2, the determination condition storing unit 100A stores the number of the times M above and the corresponding predetermined threshold value above for each of the maximum value, the minimum value, and the average value.

The communication switching unit 104 switches the communication channel used by the communication unit 101 for the communication with the smartphone 210, from the one communication channel to another communication channel when the communication state determining unit 103 determines that the communication state is unsatisfactory in the communication with the smartphone 210. According to the present embodiment, the communication switching unit 104 makes a switch to any one communication channel randomly selected from a plurality of the other communication channels.

FIG. 2 is a table of the exemplary determination condition stored in the determination condition storing unit 100A according to the first embodiment of the present disclosure.

As illustrated in FIG. 2, the determination condition storing unit 100A stores the corresponding threshold value, the number of the times N that the corresponding threshold value has been successively exceeded, the number of the times M that the corresponding threshold value has been exceeded for 10 seconds, for each of the maximum value, the minimum value, and the average value. The communication state determining unit 103 refers to the determination condition when determining whether the communication state is satisfactory in the communication with the smartphone 210.

For example, in FIG. 2, a threshold value of "5.0 milliseconds" is set with respect to the maximum value. A threshold value of "2.2 milliseconds" is set with respect to the minimum value. A threshold value of "2.5 milliseconds" is set with respect to the average value.

In FIG. 2, N_max represents the number of the times N that the corresponding threshold value has been successively exceeded, set with respect to the maximum value. N_min represents the number of the times N that the corresponding threshold value has been successively exceeded, set with respect to the minimum value. N_avg represents the number of the times N that the corresponding threshold value has been successively exceeded, set with respect to the average value. Individually different values can be set to N_max, N_min, and N_avg.

In FIG. 2, M_max represents the number of the times M that the corresponding threshold value has been exceeded for 10 seconds, set with respect to the maximum value. M_min represents the number of the times M that the corresponding threshold value has been exceeded for 10 seconds, set with respect to the minimum value. M_avg represents the number of the times M that the corresponding threshold value has been exceeded for 10 seconds, set with respect to the average value. Individually different values can be set to M_max, M_min, and M_avg.

Note that, the following conditional expression is preferably satisfied: N_max<N_avg<N_min In addition, the following conditional expression is preferably satisfied: M_max<M_avg<M_min This is because the determination that the communication state is unsatisfactory is preferably made with a smaller number of times (namely, faster) when a larger threshold value is exceeded (namely, when a communication delay is larger).

According to the determination condition in FIG. 2, when the maximum value in the 10 times (for one second) of the communication delay time measured with the ping command, has successively exceeded a threshold value of "5.0 milliseconds" more than N_max times, or when the maximum value has exceeded a threshold value of "5.0 milliseconds" M_max times or more for 10 seconds, the communication state determining unit 103 determines that the communication state is unsatisfactory in the communication with the smartphone 210.

When the minimum value in the 10 times (for one second) of the communication delay time has successively exceeded a threshold value of "2.2 milliseconds" more than N_min times, or when the minimum value has exceeded a threshold value of "2.2 milliseconds" M_min times or more for 10 seconds, the communication state determining unit 103 determines that the communication state is unsatisfactory in the communication with the smartphone 210.

When the average value in the 10 times (for one second) of the communication delay time has successively exceeded a threshold value of "2.5 milliseconds" more than N_avg times, or when the average value has exceeded a threshold value of "2.5 milliseconds" M_avg times or more for 10 seconds, the communication state determining unit 103 determines that the communication state is unsatisfactory in the communication with the smartphone 210.

The reason why a plurality of times of the excess over the predetermined threshold values is used in the determination condition in this manner, is because the communication state is prevented from being determined to be unsatisfactory when the communication delay time measured with the ping command accidentally exceeds the predetermined threshold values due to, for example, noise.

The reason why the maximum value, the minimum value, and the average value are used in the determination condition is because the determination condition can be set in detail in order to be able to determine that the communication state is unsatisfactory with a smaller number of times (namely, faster) when a larger threshold value is exceeded (namely, when the communication delay is large) as described above.

Figure 3:
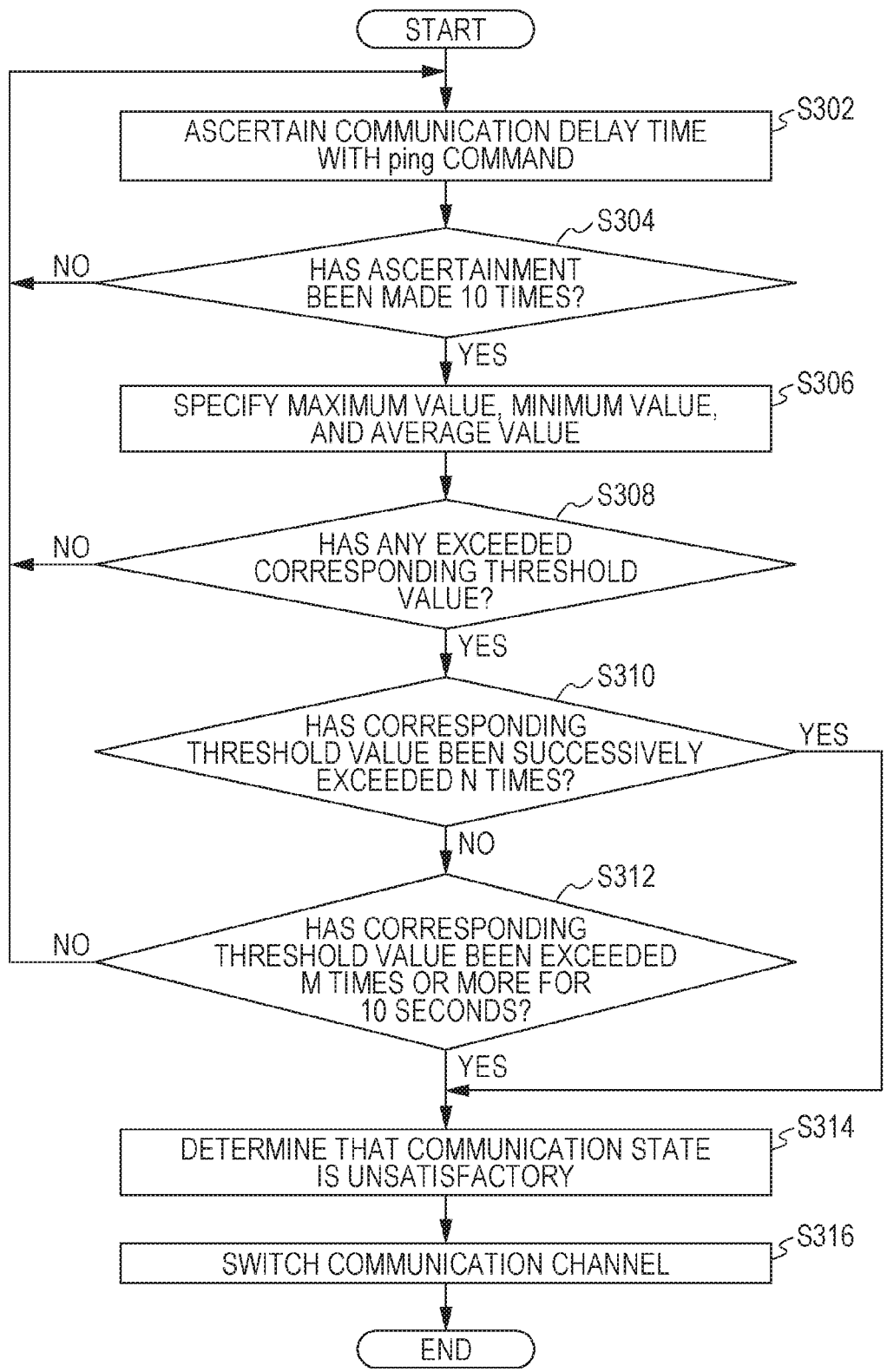
FIG. 3 is a flow chart of exemplary processing by the on-vehicle equipment according to the first embodiment of the present disclosure.

FIG. 3 is a flow chart of exemplary processing by the on-vehicle equipment 100 according to the first embodiment of the present disclosure. The processing illustrated in FIG. 3 starts, for example, when the communication unit 101 starts the wireless communication with the smartphone 210. The processing is repeatedly performed during the performance of the wireless communication.

First, the first communication time ascertaining unit 102 transmits the ping command to the smartphone 210 so as to ascertain the communication delay time in the communication with the smartphone 210 (step S302). Next, the first communication time ascertaining unit 102 determines whether the communication delay time in the communication with the smartphone 210 has been ascertained 10 times (step S304). Here, when the first communication time ascertaining unit 102 determines that the communication delay time in the communication with the smartphone 210 has not been ascertained 10 times (step S304: No), the first communication time ascertaining unit 102 performs the processing at steps S302 and S304 again.

Meanwhile, when the first communication time ascertaining unit 102 determines that the communication delay time in the communication with the smartphone 210 has been ascertained 10 times (step S304: Yes), the communication state determining unit 103 individually specifies the maximum value, the minimum value, and the average value of the ascertained 10 times of the communication delay time (step S306).

Then, the communication state determining unit 103 determines whether the maximum value, the minimum value, and the average value specified at step S306 have individually exceeded the corresponding predetermined threshold values stored in the determination condition storing unit 100A (step S308).

Here, when the communication state determining unit 103 determines that any of the maximum value, the minimum value, and the average value have not exceeded the corresponding predetermined threshold values (step S308: No), the on-vehicle equipment 100 performs the processing from step S302 again.

Meanwhile, when the communication state determining unit 103 determines that any of the maximum value, the minimum value, and the average value has exceeded the corresponding predetermined threshold value (step S308: Yes), the communication state determining unit 103 determines whether the corresponding predetermined threshold value has been successively exceeded N times, in consideration of the excess of the corresponding predetermined threshold value at step S308 (step S310).

Here, when the communication state determining unit 103 determines that the corresponding predetermined threshold value has been successively exceeded N times (step S310:

Yes), the on-vehicle equipment 100 makes the processing proceed to step S314. Meanwhile, when the communication state determining unit 103 determines that the corresponding predetermined threshold value has not been successively exceeded N times (step S310: No), the communication state determining unit 103 determines whether the corresponding predetermined threshold value has been exceeded M times or more for 10 seconds, in consideration of the excess of the corresponding predetermined threshold value at step S308 (step S312).

Here, when the communication state determining unit 103 determines that the corresponding predetermined threshold value has not been exceeded M times or more for 10 seconds (step S312: No), the on-vehicle equipment 100 performs the processing from step S302 again. Meanwhile, the communication state determining unit 103 determines that the corresponding predetermined threshold value has been exceeded M times or more for 10 seconds (step S312: Yes), the on-vehicle equipment 100 makes the processing proceed to step S314.

At step S314, the communication state determining unit 103 determines that the communication state is unsatisfactory in the communication with the smartphone 210. Accordingly, the communication switching unit 104 switches the communication channel used by the communication unit 101 for the communication with smartphone 210 from the one communication channel being currently used to another communication channel (step S316). Then, the on-vehicle equipment 100 completes a series of the processing illustrated in FIG. 3.

Figure 4A:
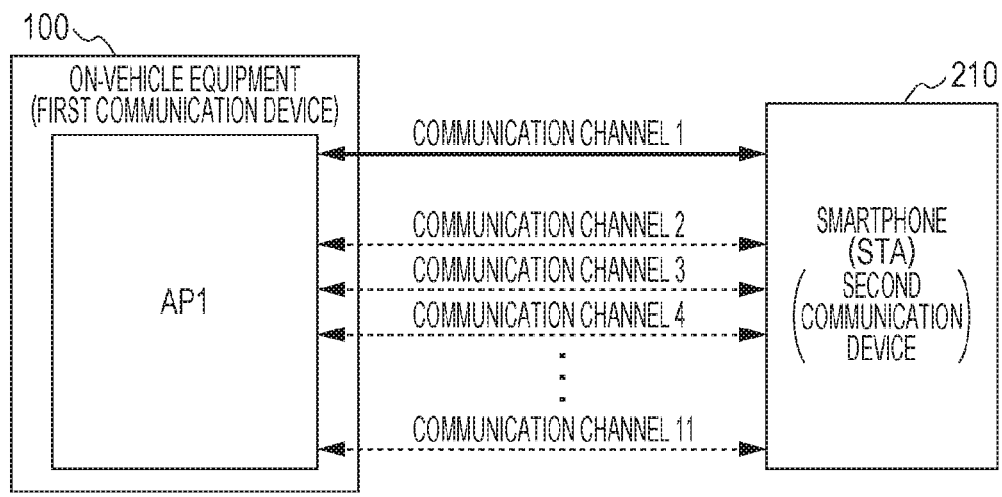
FIGS. 4A and 4B are diagrams illustrating exemplary switching operation by the on-vehicle equipment according to the first embodiment of the present disclosure.
Figure 4B:
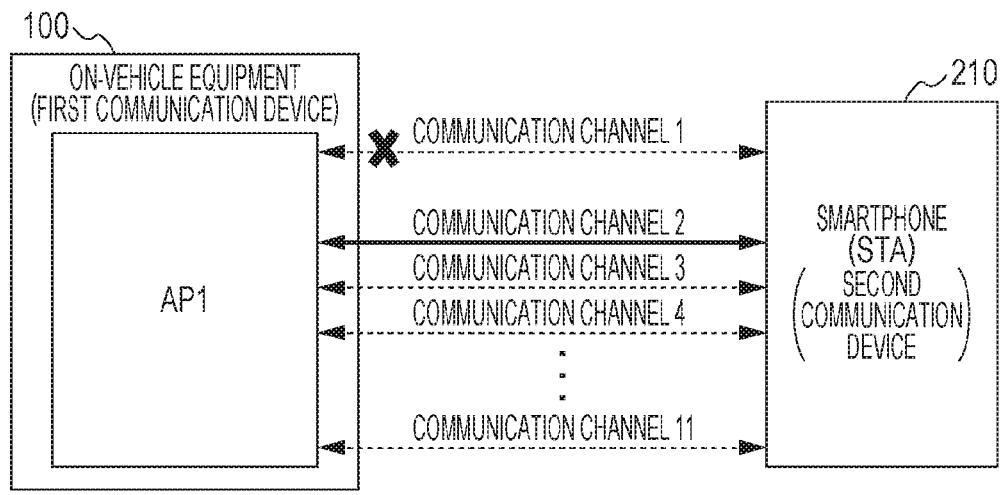

FIGS. 4A and 4B are diagrams illustrating exemplary switching operation by the on-vehicle equipment 100 according to the first embodiment of the present disclosure.

FIG. 4A illustrates a utilization state of the communication channel before the on-vehicle equipment 100 performs the switching operation of the communication channel. In the example illustrated in FIG. 4A, a communication channel 1 randomly selected by the communication unit 101 out of a plurality of communication channels 1 to 11 is used in the communication between the on-vehicle equipment 100 (the access point AP1) and the smartphone 210 (the STA).

FIG. 4B illustrates a utilization state of the communication channel after the on-vehicle equipment 100 performs the switching operation of the communication channel. For example, as illustrated in FIG. 4A, when a vehicle moves so as to enter another communication area during the performance of the communication between the communication unit 101 and the smartphone 210 through the communication channel 1, in some cases, the communication channel 1 has already been used for communication with another communication device in the communication area and the communication channel 1 is shared with the other communication device. In this case, while the other communication device practically performs the communication, the communication unit 101 of the on-vehicle equipment 100 is required to make the communication be on standby. In this case, when the communication state determining unit 103 ascertains that the communication delay time with the smartphone 210, with the ping command, has exceeded the predetermined threshold values a plurality of times (successively N times, or M times or more for 10 seconds), the communication state determining unit 103 determines that the communication state with the smartphone 210 through the communication channel 1 is unsatisfactory.

In this case, as illustrated in FIG. 4B, the communication switching unit 104 switches the communication channel used for the communication between the communication unit 101 and the smartphone 210, from the communication channel 1 to any of a plurality of the other communication channels 2 to 11. In the example illustrated in FIG. 4B, the communication unit 101 makes a switch to the randomly selected communication channel 2. Accordingly, the communication between the communication unit 101 of the on-vehicle equipment 100 and the smartphone 210 is performed through the communication channel 2 so that the communication state improves.

Note that, after the switching to the communication channel 2, furthermore, when the communication state determining unit 103 determines that the communication state of the communication channel 2 is unsatisfactory, the communication switching unit 104 switches the communication channel used for the communication with the smartphone 210 back to the previous communication channel 1 so that the communication unit 101 continuously performs the communication through the previous communication channel 1. That is, no switching to any of the communication channels 3 to 11 is performed. Accordingly, even when a communication state of a communication channel to which the switching is made is unsatisfactory, the communication channel is prevented from being switched one after another.

As described above, according to the first embodiment of the present disclosure, only when it is ascertained that the communication state with the smartphone 210 is unsatisfactory, based on the communication delay time practically ascertained with the ping command, the switching of the communication channel used for the communication with the smartphone 210 is performed. Therefore, according to the first embodiment of the present disclosure, the delay in the communication can be inhibited without the communication channel switched fruitlessly in the communication including the plurality of available channels.

Particularly, the communication state with the smartphone 210 is ascertained with the ping command for simply ascertaining communication accessibility so that the influence, due to the performance of the ascertainment, can be minimized on the communication between the communication unit 101 and the smartphone 210.

Next, a second embodiment of the present disclosure will be described with reference to FIGS. 5 to 8B. Note that, in the following descriptions, only alterations with respect to the first embodiment will be described. The others are the same as those according to the first embodiment and the descriptions thereof will be omitted.

Figure 5:
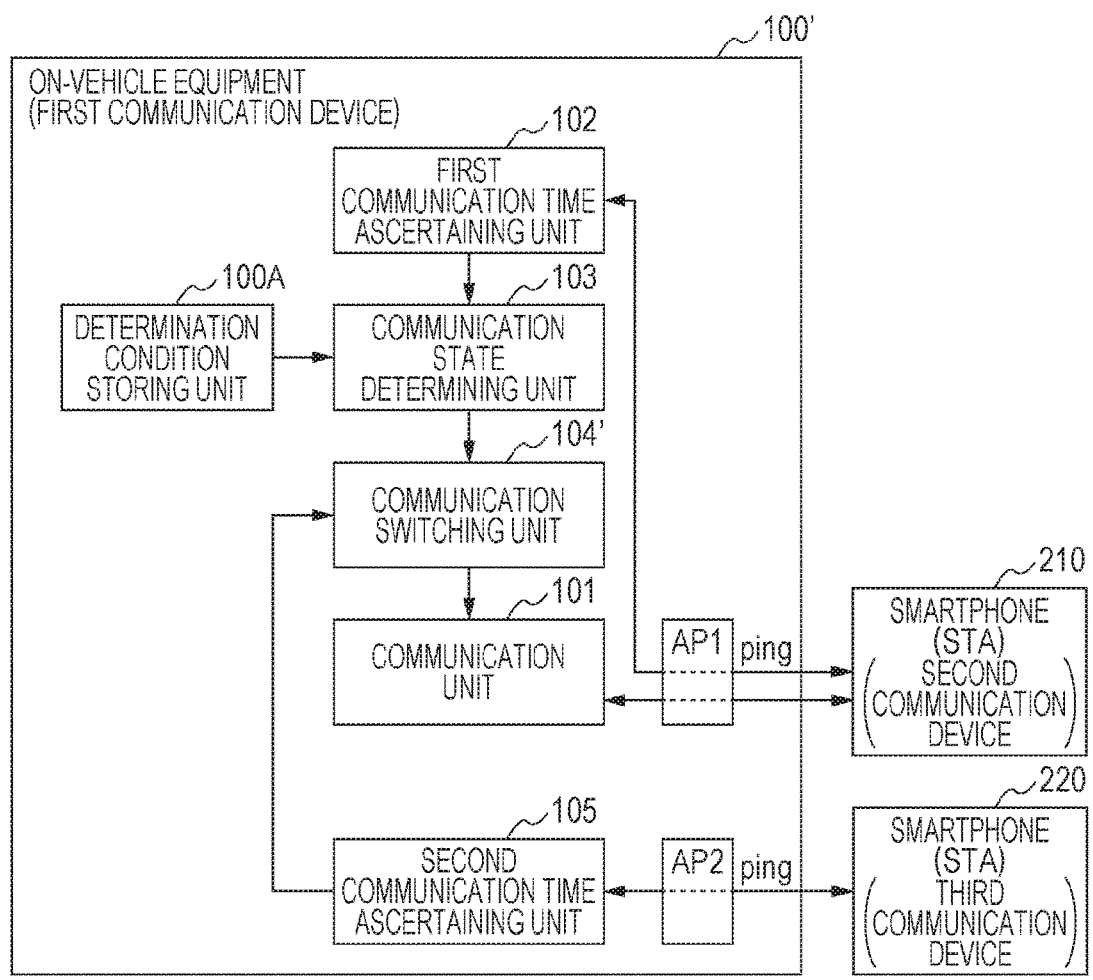
FIG. 5 is a block diagram of an exemplary functional configuration of on-vehicle equipment according to a second embodiment of the present disclosure.

FIG. 5 is a block diagram of an exemplary functional configuration of an on-vehicle equipment 100' according to a second embodiment of the present disclosure. FIG. 5 illustrates a communication system 10*b* including the on-vehicle equipment 100' (a first communication device), a smartphone 210 (a second communication device), and a smartphone 220 (a third communication device). The on-vehicle equipment 100' further includes an access point AP2 and a second communication time ascertaining unit 105, and includes a communication switching unit 104' instead of the communication switching unit 104, differently from the on-vehicle equipment 100 according to the first embodiment.

For each of a plurality of other communication channels available for communication between the communication unit 101 and the smartphone 210 (other communication channels except a communication channel currently being used by the communication unit 101), the second communication time ascertaining unit 105 sequentially transmits a ping command to the smartphone 220 (the third communication device), switching a communication channel, through the access point AP2 included in the on-vehicle equipment 100' (the other access point different from an access point AP1 currently being used by the communication unit 101). Then, the second communication time ascertaining unit 105 previously ascertains communication delay time of each of the plurality of other communication channels. Note that, the "previously ascertainment" here indicates that the ascertainment is made in parallel to the communication between the communication unit 101 and the smartphone 210 and an ascertainment result is stored in a memory.

When a communication state determining unit 103 determines that a communication state is unsatisfactory in the communication between the communication unit 101 and the smartphone 210, the communication switching unit 104' switches the communication channel used for the communication between the communication unit 101 and the smartphone 210, to another communication channel having the shortest communication delay time previously ascertained by the second communication time ascertaining unit 105, out of the plurality of other communication channels. Here, the communication switching unit 104' refers to the latest ascertainment result stored in the memory by the second communication time ascertaining unit 105 so as to specify another communication channel having the shortest communication delay time.

Figure 6:
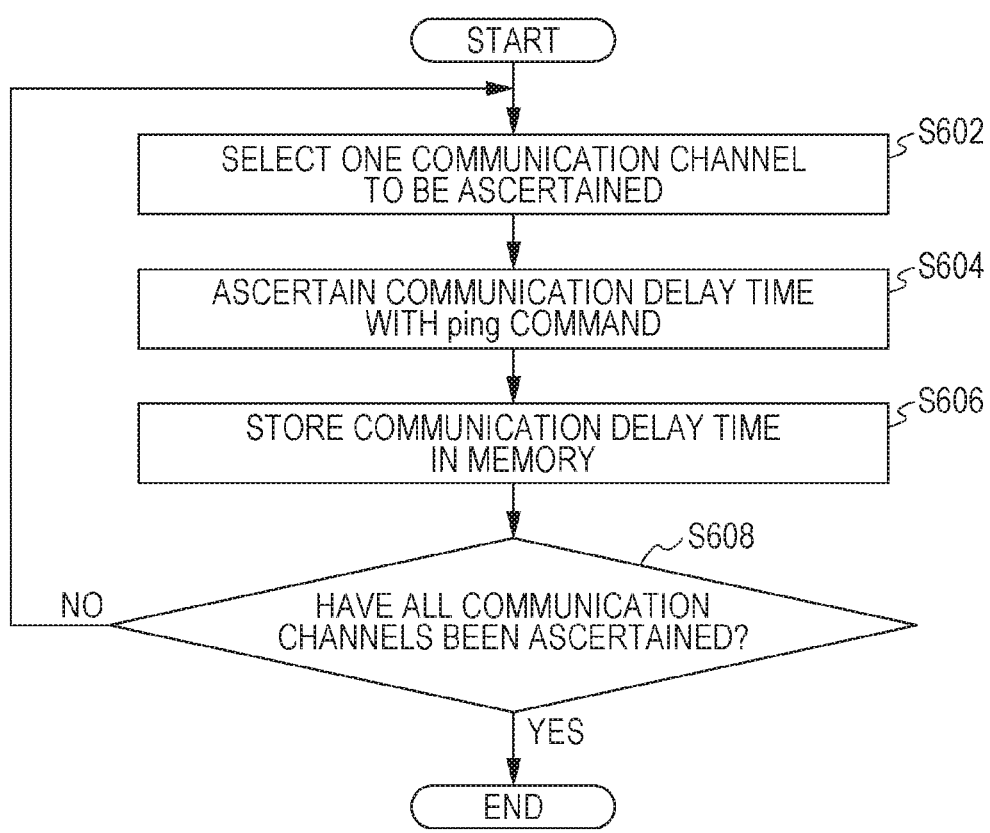
FIG. 6 is a flow chart of exemplary processing by a second communication time ascertaining unit according to the second embodiment of the present disclosure.

FIG. 6 is a flow chart of exemplary processing by the second communication time ascertaining unit 105 according to the second embodiment of the present disclosure. The processing illustrated in FIG. 6 starts, for example, when the communication unit 101 starts wireless communication with the smartphone 210. The processing is repeatedly performed in parallel to processing illustrated in FIG. 7 during the performance of the wireless communication.

First, the second communication time ascertaining unit 105 selects any one of the plurality of other communication channels (communication channels except a communication channel being currently used by the communication unit 101) (step S602). Then, the second communication time ascertaining unit 105 transmits the ping command to the smartphone 220 through the one communication channel selected at step S602 so as to ascertain the communication delay time of the one communication channel (step S604). Furthermore, the second communication time ascertaining unit 105 stores the communication delay time ascertained at step S604, into a memory (step S606).

Subsequently, the second communication time ascertaining unit 105 determines whether the communication delay time of all of the other communication channels has been ascertained (step S608). Here, when the second communication time ascertaining unit 105 determines that the communication delay time of all of the other communication channels has not been ascertained (step S608: No), the second communication time ascertaining unit 105 performs the processing from step S602 again. Meanwhile, the second communication time ascertaining unit 105 determines that the communication delay time of all of the other communication channels has been ascertained (step S608: Yes), the second communication time ascertaining unit 105 completes a series of the processing illustrated in FIG. 6.

FIG. 7 is a flow chart of exemplary processing by the on-vehicle equipment 100' according to the second embodiment of the present disclosure. The processing illustrated in FIG. 7 starts, for example, when the communication unit 101 starts the wireless communication with the smartphone 210. The processing is repeatedly performed during the performance of the wireless communication.

First, the first communication time ascertaining unit 102 transmits the ping command to the smartphone 210 so as to ascertain the communication delay time in the communication with the smartphone 210 (step S702). Next, the first communication time ascertaining unit 102 determines whether the communication delay time in the communication with the smartphone 210 has been ascertained 10 times (step S704). Here, when the first communication time ascertaining unit 102 determines that the communication delay time in the communication with the smartphone 210 has not been ascertained 10 times (step S704: No), the first communication time ascertaining unit 102 performs the processing at step S702 again.

Meanwhile, when the first communication time ascertaining unit 102 determines that the communication delay time in the communication with the smartphone 210 has been ascertained 10 times (step S704: Yes), the communication state determining unit 103 individually specifies a maximum value, a minimum value, and an average value of the ascertained 10 times of the communication delay time (step S706).

Then, the communication state determining unit 103 determines whether the maximum value, the minimum value, and the average value specified at step S706 have individually exceeded corresponding predetermined threshold values stored in a determination condition storing unit 100A (step S708).

Here, when the communication state determining unit 103 determines that any of the maximum value, the minimum value, and the average value have not exceeded the corresponding predetermined threshold values (step S708: No), the on-vehicle equipment 100' performs the processing from step S702 again.

Meanwhile, when the communication state determining unit 103 determines that any of the maximum value, the minimum value, and the average value has exceeded the corresponding threshold value (step S708: Yes), the communication state determining unit 103 determines whether the corresponding threshold value has been successively exceeded N times, in consideration of the excess of the corresponding predetermined threshold value at step S708 (step S710).

Here, when the communication state determining unit 103 determines that the corresponding predetermined threshold value has been successively exceeded N times (step S710: Yes), the on-vehicle equipment 100' makes the processing proceed to step S714. Meanwhile, when the communication state determining unit 103 determines that the corresponding predetermined threshold value has not been successively exceeded N times (step S710: No), the communication state determining unit 103 determines whether the corresponding predetermined threshold value has been exceeded M times or more for 10 seconds, in consideration of the excess of the corresponding predetermined threshold value at step S708 (step S712).

Here, when the communication state determining unit 103 determines that the corresponding predetermined threshold value has not been exceeded M times or more for 10 seconds (step S712: No), the on-vehicle equipment 100' performs the processing from step S702 again. Meanwhile, when the communication state determining unit 103 determines that the corresponding predetermined threshold value has been exceeded M times or more for 10 seconds (step S712: Yes), the on-vehicle equipment 100' makes the processing proceed to step S714.

At step S714, the communication state determining unit 103 determines that the communication state is unsatisfactory in the communication with the smartphone 210. Accordingly, the communication switching unit 104' switches the communication channel used by the communication unit 101 for the communication with the smartphone 210, from the one communication channel being currently used, to the other communication channel having the shortest communication delay time previously ascertained during the processing by the second communication time ascertaining unit 105 (refer to FIG. 6) (step S716). Then, the on-vehicle equipment 100' completes a series of the processing illustrated in FIG. 7.

Figure 8A:
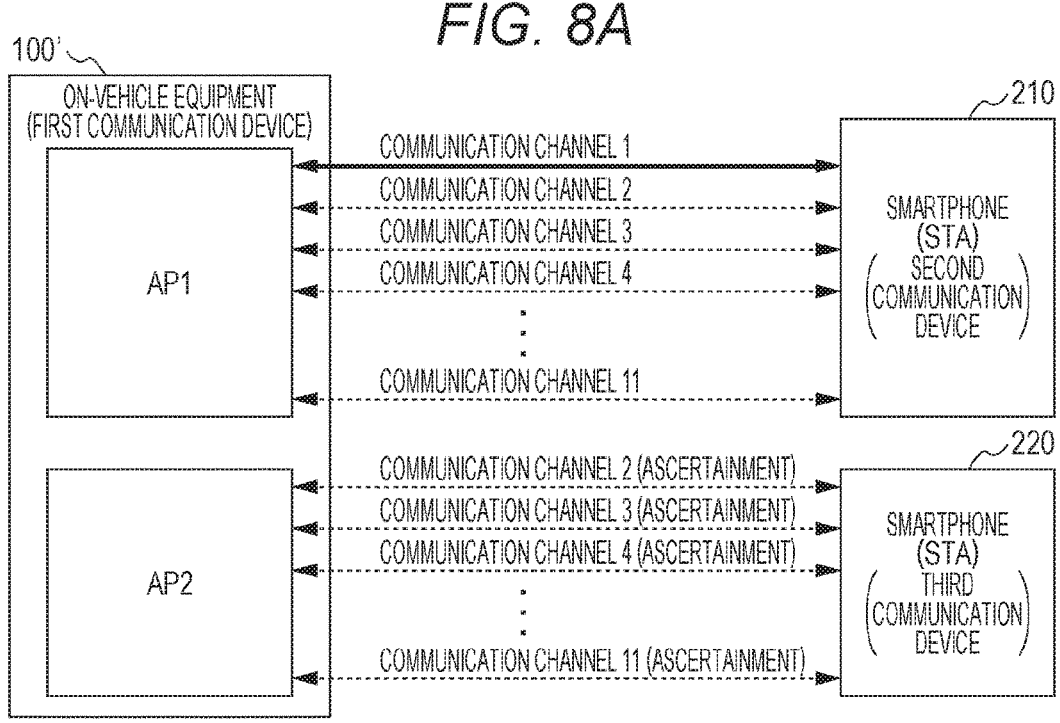
FIGS. 8A and 8B are diagrams illustrating exemplary switching operation by the on-vehicle equipment according to the second embodiment of the present disclosure.
Figure 8B:
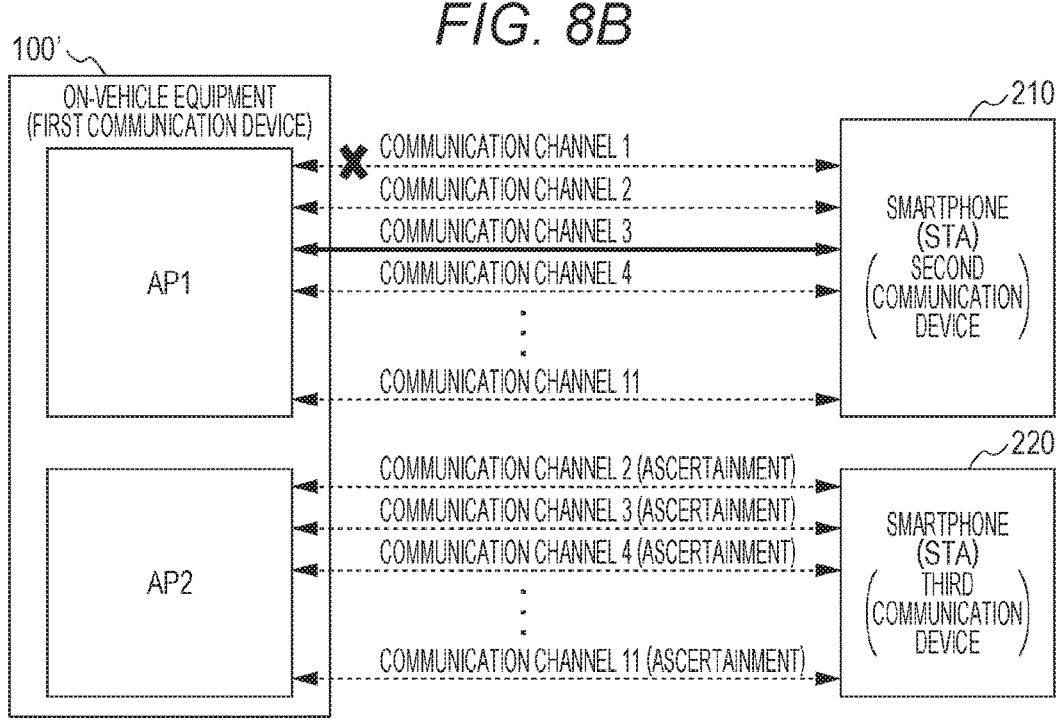

FIGS. 8A and 8B are diagrams illustrating exemplary switching operation by the on-vehicle equipment 100' according to the second embodiment of the present disclosure.

FIG. 8A illustrates a utilization state of the communication channel before the on-vehicle equipment 100' performs the switching operation of the communication channel. In the example illustrated in FIG. 8A, a communication channel 1 randomly selected by the communication unit 101 out of a plurality of communication channels 1 to 11 is used in the communication between the on-vehicle equipment 100' (the access point AP1) and the smartphone 210 (an STA).

For each of a plurality of the communication channels 2 to 11, the second communication time ascertaining unit 105 transmits the ping command to the smartphone 220 (an STA) through the access point AP2 so as to previously ascertain communication delay time of each of the plurality of the communication channels 2 to 11 (in parallel to the processing for ascertaining the communication state with the smartphone 210, by the first communication time ascertaining unit 102).

FIG. 8B illustrates a utilization state of the communication channel after the on-vehicle equipment 100' performs the switching operation of the communication channel. For example, as illustrated in FIG. 8A, when a vehicle moves so as to enter another communication area during the performance of the communication between the communication unit 101 and the smartphone 210 through the communication channel 1, in some cases, the communication channel 1 has already been used for communication with another communication device in the communication area and the communication channel 1 is shared with the other communication device. In this case, while the other communication device practically performs the communication, the communication unit 101 of the on-vehicle equipment 100' is required to make the communication be on standby. In this case, when the communication state determining unit 103 ascertains that the communication delay time with the smartphone 210, with the ping command, has exceeded the predetermined threshold values a plurality of times (successively N times, or M times or more for 10 seconds), the communication state determining unit 103 determines that the communication state with the smartphone 210 through the communication channel 1 is unsatisfactory.

In this case, as illustrated in FIG. 8B, the communication switching unit 104' switches the communication channel used for the communication between the communication unit 101 and the smartphone 210, from the communication channel 1 to a communication channel having the shortest communication delay time previously ascertained by the second communication time ascertaining unit 105, out of the plurality of the communication channels 2 to 11. In the example illustrated in FIG. 8B, the switching is made to the communication channel 3 having the shortest communication delay time previously ascertained by the second communication time ascertaining unit 105. Accordingly, the communication between the communication unit 101 of the on-vehicle equipment 100' and the smartphone 210, is performed through the communication channel 3. Thus, the communication state improves so as to be in a more favorable state.

As described above, according to the second embodiment, the communication channel used for the communication with the smartphone 210 is switched to the other communication channel having the previously ascertained shortest communication delay time. Thus, the switching of the communication channel can be performed so as to make the communication state with the smartphone 210 optimum and so as to prevent the switching from being made to a communication channel being used by the other communication device.

Particularly, the communication delay time of the plurality of other communication channels is ascertained between the on-vehicle equipment 100' and the other smartphone 220 through the other access point AP2 different from the access point AP1 used for the communication with smartphone 210. Thus, the ascertainment can be made without influence on the communication between the communication unit 101 and the smartphone 210 through the access point AP1.

Next, a third embodiment of the present disclosure will be described with reference to FIGS. 9 and 10A and 10B. Note that, in the following descriptions, only alterations with respect to the first embodiment will be described. The others are the same as those according to the first embodiment and the descriptions thereof will be omitted.

Figure 9:
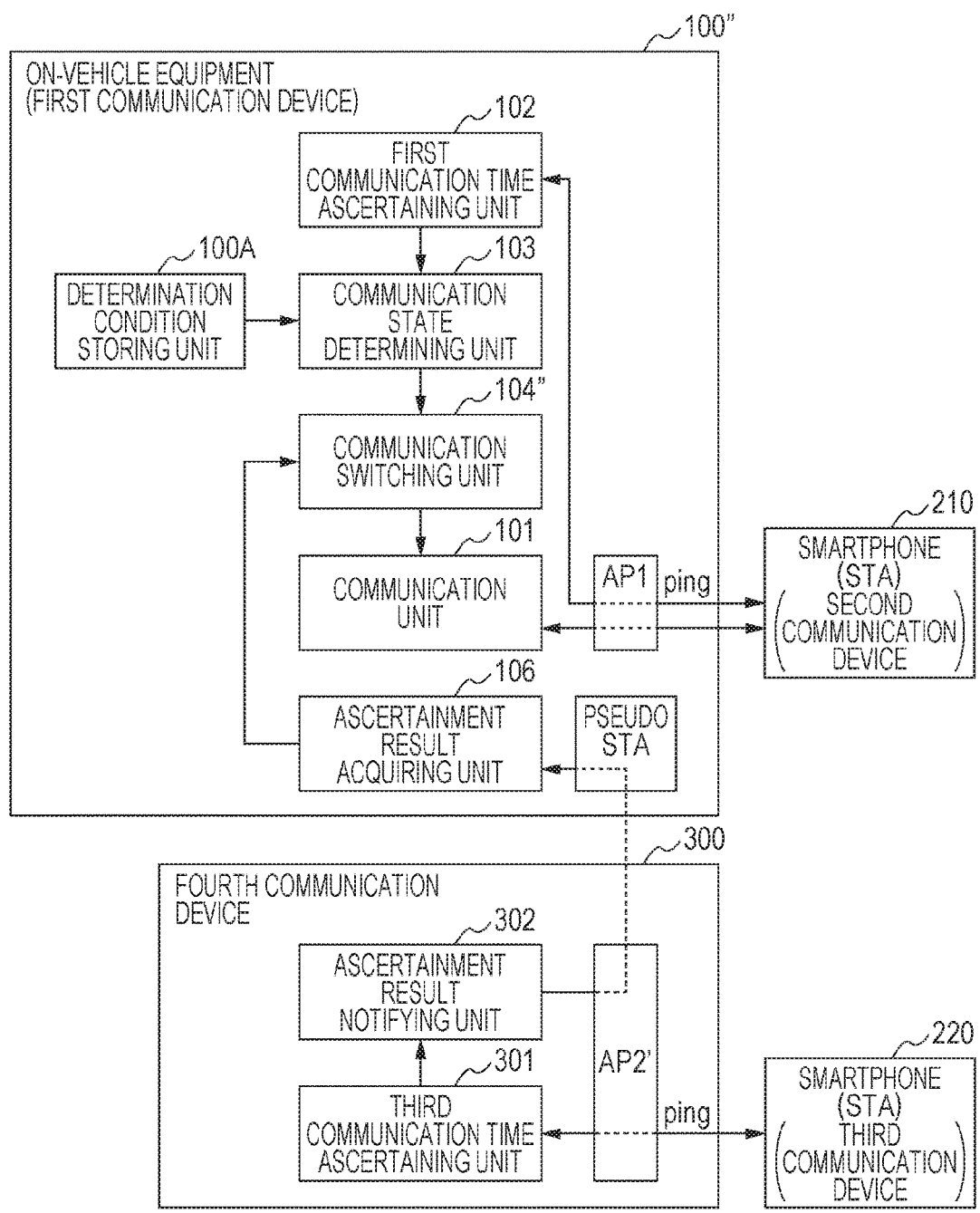
FIG. 9 is a block diagram of an exemplary functional configuration of on-vehicle equipment according to a third embodiment of the present disclosure.

FIG. 9 is a block diagram of an exemplary functional configuration of an on-vehicle equipment 100" according to the third embodiment of the present disclosure. FIG. 9 illustrates a communication system 10c including the on-vehicle equipment 100" (a first communication device), a smartphone 210 (a second communication device), a smartphone 220 (a third communication device), and a fourth communication device 300. The on-vehicle equipment 100" further includes a pseudo STA and an ascertainment result acquiring unit 106, and includes a communication switching unit 104" instead of the communication switching unit 104, differently from the on-vehicle equipment 100 according to the first embodiment.

The fourth communication device 300 includes an access point AP2', a third communication time ascertaining unit 301, and an ascertainment result notifying unit 302. For each of a plurality of communication channels, the third communication time ascertaining unit 301 sequentially transmits a ping command to the smartphone 220, switching a communication channel, through the access point AP2'. Then, the third communication time ascertaining unit 301 previously ascertains communication delay time of each of the plurality of communication channels.

The ascertainment result notifying unit 302 notifies the on-vehicle equipment 100" of an ascertainment result of the communication delay time of each of the plurality of communication channels, by the third communication time ascertaining unit 301, or specifying information capable of specifying a communication channel having the shortest communication delay time based on the ascertainment result (for example, identifying information on the communication channel having the shortest communication delay time). Note that, this notification may be continuously, repeatedly performed, or may be performed in response to a request from the ascertainment result acquiring unit 106.

The ascertainment result acquiring unit 106 acquires the communication delay time of each of the plurality of communication channels, previously ascertained by the fourth communication device 300 (the third communication time ascertaining unit 301), or the specifying information capable of specifying the communication channel having the shortest communication delay time, from the fourth communication device 300. This acquisition is performed through the access point AP2' of the fourth communication device 300 and the pseudo STA of the on-vehicle equipment 100". That is, the pseudo STA of the on-vehicle equipment 100" is provided in order to perform communication with the access point AP2' of the fourth communication device 300 (no communication can be performed between an access point AP1 and the access point AP2').

When a communication state determining unit 103 determines that a communication state is unsatisfactory in communication between a communication unit 101 and the smartphone 210, the communication switching unit 104" switches a communication channel used for the communication between the communication unit 101 and the smartphone 210, to the other communication channel having the shortest communication delay time, specified with the information acquired by the ascertainment result acquiring unit 106, out of the plurality of other communication channels (the ascertainment result of the communication delay time of each of the plurality of communication channels or the specifying information capable of specifying the communication channel having the shortest communication delay time).

Figure 10A:
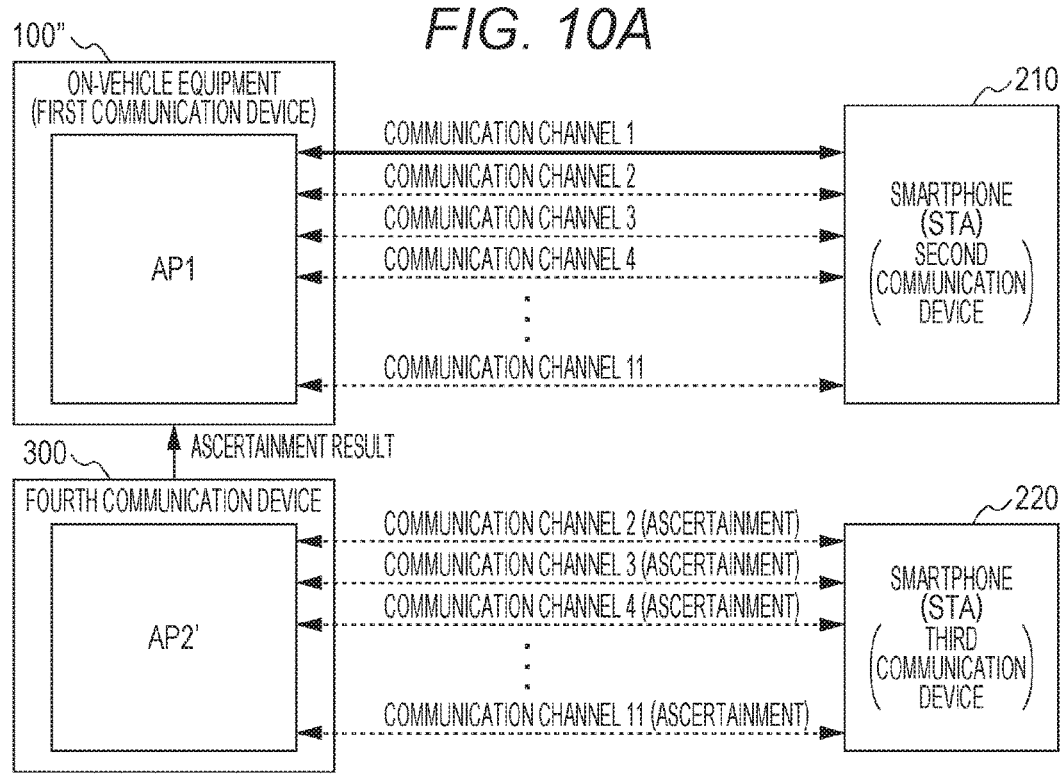
FIGS. 10A and 10B are diagrams illustrating exemplary switching operation by the on-vehicle equipment according to the third embodiment of the present disclosure.
Figure 10B:
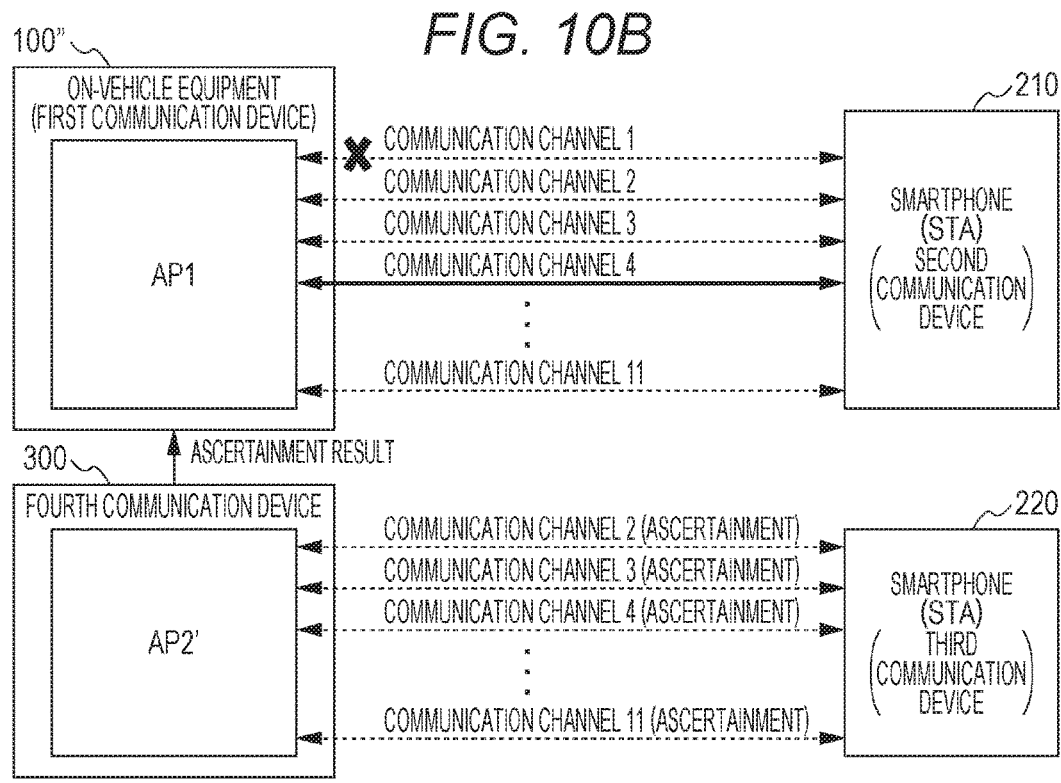

FIGS. 10A and 10B are diagrams illustrating exemplary switching operation by the on-vehicle equipment 100" according to the third embodiment of the present disclosure.

FIG. 10A illustrates a utilization state of the communication channel before the on-vehicle equipment 100" performs the switching operation of the communication channel. In the example illustrated in FIG. 10A, a communication channel 1 randomly selected by the communication unit 101 out of a plurality of communication channels 1 to 11 is used in the communication between the on-vehicle equipment 100" (the access point AP1) and the smartphone 210 (an STA).

For each of a plurality of the communication channels 2 to 11, the fourth communication device 300 (the third communication time ascertaining unit 301) transmits the ping command to the smartphone 220 (an STA) through the access point AP2' of the fourth communication device 300 so as to previously ascertain communication delay time of each of the plurality of the communication channels 2 to 11. The ascertainment result acquiring unit 106 of the on-vehicle equipment 100" acquires this ascertainment result or specifying information capable of specifying identifying information on a communication channel having the shortest communication delay time, based on this ascertainment result, through the access point AP2' of the fourth communication device 300 and the pseudo STA of the on-vehicle equipment 100".

FIG. 10B illustrates a utilization state of the communication channel after the on-vehicle equipment 100" performs the switching operation of the communication channel. For example, as illustrated in FIG. 10A, when a vehicle moves so as to enter another communication area during the performance of the communication between the communication unit 101 and the smartphone 210 through the communication channel 1, in some cases, the communication channel 1 has already been used for communication with another communication device in the communication area and the communication channel 1 is shared with the other communication device. In this case, while the other communication device practically performs the communication, the communication unit 101 of the on-vehicle equipment 100" is required to make the communication be on standby. In this case, when the communication state determining unit 103 ascertains that the communication delay time with the smartphone 210, with the ping command, has exceeded predetermined threshold values a plurality of times (successively N times, or M times or more for 10 seconds), the communication state determining unit 103 determines that the communication state with the smartphone 210 through the communication channel 1 is unsatisfactory.

In this case, as illustrated in FIG. 10B, the communication switching unit 104" switches the communication channel used for the communication between the communication unit 101 and the smartphone 210, from the communication channel 1 to the communication channel having the shortest communication delay time previously ascertained by the fourth communication device 300 (the third communication time ascertaining unit 301), out of the plurality of the other communication channels 2 to 11. In the example illustrated in FIG. 10B, the switching is made to the communication channel 4 having the shortest communication delay time previously ascertained by the fourth communication device 300 (the third communication time ascertaining unit 301). Accordingly, the communication between the communication unit 101 of the on-vehicle equipment 100" and the smartphone 210 is performed through the communication channel 4. Thus, the communication state improves so as to be in a more favorable state.

As described above, according to the third embodiment of the present disclosure, the communication channel used for the communication with the smartphone 210, is switched to the other communication having the previously ascertained shortest communication delay time. Thus, the switching of the communication channel can be performed so as to make the communication state with the smartphone 210 optimum and so as to prevent the switching from being made to a communication channel being used by the other communication device.

Particularly, the communication delay time of the plurality of the other communication channels is ascertained between the fourth communication device 300 and the other smartphone 220. Thus, the ascertainment can be made without influence on the communication between the communication unit 101 and the smartphone 210 through the access point AP1 and without a load given to the on-vehicle equipment 100".

Note that, according to the respective embodiments, the ping command is used as an example of the echo request command for ascertaining the communication delay time of each of the communication channels, but the present disclosure is not limited to this. That is, another command that can ascertain the communication delay time of each of the communication channels and has its own relatively small data traffic may be used.

Note that, according to the respective embodiments, the pieces of on-vehicle equipment 100, 100', and 100" are used as examples of the first communication device, but the present disclosure is not limited to this. According to the respective embodiments, the smartphone 210 is used as an example of the second communication device, but the present disclosure is not limited to this. The first communication device and the second communication device may be any communication devices that can mutually perform the wireless communication. For example, the first communication device and the second communication device both may be communication devices to be mounted on vehicles, or communication devices other than the communication devices to be mounted on a vehicle. The first communication device and the second communication device both may be communication devices to be stationarily disposed at specific places (for example, personal computers), or may be communication devices having portability (for example, smartphones, tablet terminals, or mobile phones).

According to the above second and third embodiments, the smartphone 220 is used as an example of the third communication device, but the present disclosure is not limited to this. The third communication device may be any communication device that can perform the wireless communication with the first communication device (in the second embodiment) or the fourth communication device (in the third embodiment). The fourth communication device may be also any communication device that can perform the wireless communication with the first communication device and the third communication device. Note that, in the above second and third embodiments, functions that ascertain communication delay time of a plurality of other communication channels (namely, functions of the second communication time ascertaining unit 105 and the third communication time ascertaining unit 301), provided on the side of the access points (namely, on the side of the on-vehicle equipment 100' and on the side of the fourth communication device 300), may be provided on the side of the STA (namely, on the side of the smartphone 220).

According to each of the above embodiments, when any of the maximum value, the minimum value, and the average value has exceeded the corresponding predetermined threshold value a plurality of times (successively N time, or M times or more for 10 seconds), the communication state is determined to be unsatisfactory, but the present disclosure is not limited to this. For example, when any of the maximum value, the minimum value, and the average value has exceeded the corresponding predetermined threshold value at least one time, the communication state may be determined to be unsatisfactory. When the communication delay time simply ascertained with the ping command, has exceeded the corresponding predetermined threshold value one time or a plurality of times without the maximum value, the minimum value, and the average value, distinguished, the communication state may be determined to be unsatisfactory.

When any of the maximum value, the minimum value, and the average value has exceeded the corresponding predetermined threshold value, the excess is counted so as to be one time. When the number of the counts has become a plurality of times (successively N times, or M times or more for 10 seconds), the communication state may be determined to be unsatisfactory.

According to each of the above embodiments, the determination of whether the communication state is satisfactory, is made with all of the maximum value, the minimum value, and the average value. The determination of whether the communication state is satisfactory, may be made with any two of the maximum value, the minimum value, and the average value.

Any of the above embodiments have been specifically exemplified in order to achieve the present disclosure. The technical scope of the present disclosure should not be limitedly interpreted with the embodiments. That is, the present disclosure can be performed in various forms without departing from the main points or the main characteristics.

What is claimed is:

1. A communication device comprising:
a communication unit configured to perform communication with a second communication device through any one communication channel of a plurality of communication channels;
a first communication time ascertaining unit configured to ascertain communication delay time in the communication with the second communication device, with an echo request command;
a communication state determining unit configured to determine whether a communication state is satisfactory in the communication with the second communication device, based on the communication delay time ascertained by the first communication time ascertaining unit;
a communication switching unit configured to switch a communication channel used for the communication with the second communication device, from the one communication channel to another communication channel, when the communication state determining unit determines that the communication state is unsatisfactory in the communication with the second communication device; and,
an ascertainment result acquiring unit configured to acquire an ascertainment result of communication delay time of each of a plurality of the other communication channels, ascertained by transmitting the echo request command to a third communication device by a fourth communication device, through an access point included in the fourth communication device, the fourth communication device being external to the communication device;
wherein the communication unit performs the communication with the second communication device through an access point included in the communication device; and,
wherein the communication switching unit switches the communication channel used for the communication with the second communication device, to another communication channel having shorter communication delay time specified with the ascertainment result, out of the plurality of the other communication channels, when the communication state determining unit determines that the communication state is unsatisfactory in the communication with the second communication device.

2. The communication device according to claim 1, further comprising
a second communication time ascertaining unit configured to ascertain communication delay time of each of the plurality of the other communication channels, with the echo request command,
wherein the communication switching unit switches the communication channel used for the communication with the second communication device, to another communication channel having shorter communication delay time previously ascertained by the second communication time ascertaining unit, out of the plurality of the other communication channels, when the communication state determining unit determines that the communication state is unsatisfactory in the communication with the second communication device.

3. The communication device according to claim 2,
wherein the second communication time ascertaining unit transmits the echo request command to the third communication device through another access point included in the communication device for each of the plurality of the other communication channels so as to ascertain the communication delay time of each of the plurality of the other communication channels.

4. The communication device according to claim 1,
wherein the ascertainment result acquiring unit is further configured to acquire specifying information that specifies a communication channel having the shortest communication delay time based on the ascertainment result from the fourth communication device, and,
wherein the communication switching unit switches the communication channel used for the communication with the second communication device, to another communication channel having shorter communication delay time specified with the specifying information acquired by the ascertainment result acquiring unit, out of the plurality of the other communication channels, when the communication state determining unit determines that the communication state is unsatisfactory in the communication with the second communication device.

5. The communication device according to claim 1,
wherein the first communication time ascertaining unit ascertains the communication delay time in the communication with the second communication device, a plurality of times during a predetermined time, and
the communication state determining unit i) individually specifies at least any two values of a maximum value, a minimum value, and an average value of the communication delay time ascertained the plurality of times by the first communication time ascertaining unit during the predetermined time, ii) determines whether the specified at least any two values have individually exceeded corresponding predetermined threshold values, and iii) determines that the communication state is unsatisfactory in the communication with the second communication device, when any of the specified at least any two values has exceeded the corresponding predetermined threshold values.

6. The communication device according to claim 5,
wherein when any of the specified at least any two values has successively exceeded the corresponding predetermined threshold value a predetermined number of times, the communication state determining unit determines that the communication state is unsatisfactory in the communication with the second communication device.

7. The communication device according to claim 5,
wherein when any of the specified at least any two values has exceeded the corresponding predetermined threshold value a predetermined number of times or more during the predetermined time, the communication state determining unit determines that the communication state is unsatisfactory in the communication with the second communication device.

8. The communication device according to claim 1,
wherein the echo request command is a ping command.

9. A communication control method, by a first communication device, comprising:
performing communication with a second communication device by a communication unit of the first communication device through any one communication channel of a plurality of communication channels, the communication with the second communication device performed through an access point included in the first communication device;
ascertaining communication delay time in the communication with the second communication device, with an echo request command, by a first communication time ascertaining unit of the first communication device;
determining whether a communication state is satisfactory in the communication with the second communication device, by a communication state determining unit of the first communication device, based on the communication delay time ascertained by the first communication time ascertaining unit;
acquiring an ascertainment result of communication delay time of each of a plurality of the other communication channels, ascertained by transmitting the echo request command to a third communication device by a fourth communication device through an access point included in the fourth communication device, the fourth communication device being external to the first communication device; and,
switching a communication channel used for the communication with the second communication device, from the one communication channel to another communication channel having shorter communication delay time specified with the ascertainment result, by a communication switching unit of the first communication device, when the communication state determining unit determines that the communication state is unsatisfactory in the communication with the second communication device.

10. A communication system comprising:
a first communication device; and
a second communication device,
wherein the first communication device includes:
a communication unit configured to perform communication with the second communication device through any one communication channel of a plurality of communication channels;
a first communication time ascertaining unit configured to ascertain communication delay time in the communication with the second communication device, with an echo request command;
a communication state determining unit configured to determine whether a communication state is satisfactory in the communication with the second communication device, based on the communication delay time ascertained by the first communication time ascertaining unit;
a communication switching unit configured to switch a communication channel used for the communication with the second communication device, from the one communication channel to another communication channel, when the communication state determining unit determines that the communication state is unsatisfactory in the communication with the second communication device, and,
an ascertainment result acquiring unit configured to acquire an ascertainment result of communication delay time of each of a plurality of the other communication channels, ascertained by transmitting the echo request command to a third communication device by a fourth communication device, through an access point included in the fourth communication device, the fourth communication device being external to the first communication device;
wherein the communication unit performs the communication with the second communication device through an access point included in the first communication device; and,
wherein the communication switching unit switches the communication channel used for the communication with the second communication device, to another communication channel having shorter communication delay time specified with the ascertainment result, out of the plurality of the other communication channels, when the communication state determining unit determines that the communication state is unsatisfactory in the communication with the second communication device.

* * * * *